United States Patent Office 3,143,426
Patented Aug. 4, 1964

3,143,426
METHOD OF TREATING COFFEE AND PRODUCTS OBTAINED THEREBY
Joseph Felton, 41 Park Ave., New York, N.Y.
No Drawing. Filed Oct. 16, 1961, Ser. No. 145,467
9 Claims. (Cl. 99—71)

This invention relates to methods for treating coffee beans and to products obtained therefrom.

Many attempts have been made to produce a coffee extract or "instant" coffee of superior flavor and aroma but many of the valuable and aromatic constituents of the coffee are lost during the roasting, concentrating and drying operations to which the coffee is subjected. As a result, the aroma, flavor and quality of the products obtained are impaired and the concentrate, extracts and dried products are quite unsatisfactory.

In accordance with the present invention, these objections to methods and products of the prior art are overcome and substantially all of the aroma and flavor imparting elements of the coffee are recovered in a form which serves to retain their high quality and full aroma and flavor in a usable form.

These results are preferably attained by roasting the coffee in the presence of a high boiling edible solvent which serves to dissolve and absorb volatile constituents of the coffee and those which would otherwise be decomposed or impaired and to retain them in a form wherein they may be used as obtained or employed in combination with other coffee products.

The present invention further includes improved methods for extracting and recovering valuable and aromatic elements of the roasted coffee which also may be used by themselves or combined with the products obtained during the roasting operation.

In this way, it is possible to produce a coffee extract or a coffee product which retains substantially all of the valuable and desirable constituents of the coffee in an unimpaired and undecomposed form which imparts the full flavor and aroma of the finest roasted coffee to the product.

Accordingly, the principal objects of the present invention are to provide novel and improved methods for treating coffee and to obtain a coffee extract or product characterized by superior aroma, flavor and body.

These and other objects and features of the present invention will appear from the following description thereof wherein typical and preferred procedures and products are described for the purpose of indicating the nature of the present invention but without intending to limit the scope of the invention thereby.

In carrying out the present invention, the coffee beans are roasted in the presence of a high boiling edible solvent which is capable of dissolving or absorbing aromatic constituents of the coffee. For this purpose, the green coffee beans are preferably ground to a relatively small size such as the size of ordinary roasted "percolator coffee"—that is to a size wherein most of the particles will pass a 20 mesh screen. While the size of the green coffee bean particles is not critical and it is not absolutely necessary that they be ground at all, the roasting and extracting of values from the green coffee is effected more uniformly and easily when relatively fine green coffee bean granules are employed.

The solvent employed in carrying out the roasting process may be any high boiling solvent for the constituents of the coffee and preferably is an edible or non-toxic solvent having a boiling point above about 200° C. and preferably above about 220° C. Typical of the preferred solvents which may be used are glycerin, triacetin, dipropylene glycol and the like.

The amount of the solvent employed may be varied considerably but should be sufficient to effect a thorough wetting, penetration and extraction of valuable agents from the coffee beans during the process. Thus, by way of example, from about 50 to 200 parts by weight of the solvent may be used for each 100 parts of the ground green coffee beans to be treated.

The solvent and ground green coffee beans are placed in a still or other vessel to which a condenser and receiver are connected and a limited amount of glycerin or other edible solvent are placed in the receiver. The solvent and coffee beans are then heated and thoroughly mixed or stirred as the temperature of the mixture is raised. In this way, every particle of the green coffee is thoroughly and uniformly heated and roasted while the solvent penetrates the cells of the coffee and extracts the valuable and aromatic constituents therefrom.

The temperature to which the coffee is heated in the presence of the solvent and the duration of the heating will depend in part upon the nature of the coffee extract to be obtained and the purpose for which it is to be employed. For most purposes, it is preferable to raise the temperature of the mixed solvent and ground green coffee beans to about 190 to 210° C. and to maintain this temperature for a period of about one half hour or until the coffee has been thoroughly roasted and turned dark brown in color. However, if a heavier or Turkish-like coffee product is desired, the temperature can be carried higher—say up to 250° C. and prolonged for an hour or more. In the alternative, when a light, delicately flavored extract is desired, the temperature may not exceed 190° C. and the heating may be discontinued after only 15 or 20 minutes.

During the heating and roasting of the green coffee, the temperature is kept below the boiling point of the solvent employed but well above the boiling point of water. Therefore, water contained in the green coffee and other volatile and low boiling constituents of the coffee will distill over from the mixing and heating chamber. Such water and volatile constituents, some of which may be dissolved in the water distilling over, are condensed and collected in the receiver where they are mixed with and dissolved in the glycerin or other edible solvent in the receiver.

The extract thus obtained contains substantially all of the delicate and volatile aromatic constituents of the coffee which are ordinarily lost in conventional coffee roasting operations and is a valuable and highly important coffee extract or flavoring agent. The concentration of the coffee ingredients in the extract will depend upon the amount of the glycerin or other solvent originally placed in the receiver but may be as high as 10% or more by weight.

Upon conclusion of the coffee roasting and recovery operation described above, the still or mixing and heating chamber is allowed to cool with the roasted coffee and high boiling solvent therein. Water is then added to the contents of the chamber and the temperature again raised whereby the roasted coffee is subjected to steam distillation. The temperature during this step of the operation does not greatly exceed 100° C. but should be sufficient to assure active boiling and distillation of the water added.

The amount of water added in carrying out this treatment may be rather limited and equal to no more than about 2 to 10% by weight based upon the weight of the original charge of green coffee beans placed in the chamber. The steam distillation is continued until substantially all of the added water has been removed.

The distillate obtained in this manner consists essentially of water in which water soluble coffee constituents are dissolved and may be collected separately from the glycerin extract obtained during the roasting operation. If desired, the receiver may be charged with a small amount of glycerin or other edible solvent for admixture with the aqueous distillate coming over during the steam distillation.

Following the steam distillation, an organic volatile solvent is added to the roasted and extracted coffee grounds in the heating and mixing chamber and the mixture is further stirred and subjected to refluxing. For this purpose, any of a wide range of solvents boiling below about 100° C. may be used such as methanol, ethanol, isopropanol, carbon tetrachloride, diethylene chloride and the like. The amount of the solvent used in this procedure may vary from about 50 to 200% by weight based on the weight of the original charge of green coffee bean but is preferably about 100%.

The mixture thus produced is heated and refluxed for a period of about ½ to 3 hours and preferably about 1½ hours. The mixture is then filtered and ordinarily is extracted a second time by further refluxing with isopropyl alcohol or other low boiling volatile solvent. The filtrate obtained from these extractions is then distilled at atmospheric pressure to remove the solvent and finally subjected to distillation at reduced pressure to effect the removal of final traces of the isopropyl alcohol or other solvent used in the refluxing operation.

The product thus obtained is a glycerin or similar solution of the final aromatic ingredients of the coffee whereas the residue consists of completely extracted roasted coffee grounds.

In order to illustrate typical procedure in accordance with the present invention, the following example is cited:

To a 50 gallon glass-lined jacketed still equipped with a good anchor stirrer, an internal thermometer, a condenser with a receiving container of 10 gallon capacity, are loaded 120 pounds of ground green coffee and 100 pounds of glycerin. The receiving container is loaded with 10 pounds of glycerin. While stirring the mass in the still, heat supplied by hot oil in the jacket is applied until internal temperature of 195° to 200° is reached and maintained for about 30 minutes. The vapors consisting of water and volatile coffee aromatics are trapped by the glycerin contained in the 10 gallon receiving vessel. After the roasting period and after the coffee grinds become dark brown in color, the heat is cut off and it is left to cool until about room temperature. Then 5 pounds of water is added to the roasting vessel and heat is applied until all the water is distilled and all the aromatics carried with the steam are trapped in the receiving vessel. In this instance, the distillate obtained during the roasting operation and that recovered by steam distillation were collected in the same glycerin containing receiver so as to be combined.

After cooling, 100 pounds of isopropyl alcohol is added to the roasting vesesl. The whole mass is then heated, agitated and refluxed for a period of 1½ hours. After cooling, the isopropyl alcohol is decanted from the coffee grinds and set aside. The coffee grinds are returned to the roasting vessel and to them another 50 pounds of isopropyl alcohol are added. Reflux under agitation for another hour.

After cooling, the extraction mass from the roasting vessel is filtered through the filter bag, and the resulting isopropyl alcohol extract is combined with the previous isopropyl extract. The combined extracts are filtered clearly and placed into the distillation apparatus and distilled at atmospheric pressure until all the isopropyl alcohol is distilled off. At the end, the last trace of isoprophol alcohol is removed under reduced pressure. The residual glycerin extract is then combined with the glycerin containing all volatile coffee aromatics which was set aside previously, to result in a final product of a pure and full flavor coffee concentrate.

The glycerin-coffee extract obtained during the roasting operation and the glycerin-coffee extract from the steam distillation step can be collected separately or they may be combined if desired. Further the glycerin-coffee extract obtained after refluxing with an organic solvent also may be combined with the first two extracts. The product thus obtained is a "total coffee extract" which possesses a true coffee aroma and flavor from which substantially none of the volatiles and aromatics are missing. The concentration of the extract can be varied by employing either more or less of the glycerin or other high boiling edible solvent in the receiver and roaster; but for most purposes, the product should contain from about 5 to 20% of coffee extracted ingredients. Such an extract may be used as a flavoring agent for candy, ice cream or other products or it may be added to "instant coffee" produced by other methods to increase the aroma and flavor of the product and impart a true coffee flavor thereto. Thus, the addition of from about 0.05 to 1% of the total coffee extract of the present invention to a conventional instant coffee will serve to impart greatly improved flavor and aroma thereto.

On the other hand, each of the individual coffee extracts obtained in the practice of the present invention may be used by itself to impart special or more delicate and appealing properties to a product. In the alternative, the various extracts may be combined or used in different proportions to develop individual and characteristic tastes, flavors and aromas for candy, ice cream, instant coffee or other products and to cater to the taste of different individuals or to give any product significant characteristics.

The process of the present invention further may be modified by collecting portions of the various distillates as separate fractions whereby certain objectionable or undesired mercaptans or other compounds may be eliminated or reduced in amount so as to enhance the quality of the remaining fractions collected. This also renders it possible to effect more accurate control and consistency in the finished product to compensate for inherent variations in the quality and source of the coffee beans employed in carrying out the process.

It will thus be apparent that the method of the present invention is capable of numerous variations and changes so as to obtain either a total coffee extract of superior quality or to obtain individual or blended extracts possessing particular flavors, aromas and tastes.

In view thereof it should be understood that the particular compositions and procedures described above and cited by way of example are intended to be illustrative only and are not intended to limit the scope of the invention.

I claim:

1. A method for preparing an extract containing the flavor and aroma of coffee which comprises mixing about 100 parts of green coffee with at least about 50 parts of a first solvent which serves to dissolve and absorb the aromatic constituents of the coffee and which is a water miscible liquid having a boiling point above 200° C., the amount of said first solvent being sufficient to effect a thorough wetting, penetration and extraction of the coffee, heating the mixture to a temperature of from about 190° C. to 250° C. but below the boiling point of the first solvent until the green coffee has turned brown, cooling the mixture, adding about 2 to about 10 parts of water to the cooled mixture, heating the mixture to distill the water from the mixture, recovering the volatiles which are distilled from said mixture during both of said heating steps in a second portion of said first solvent, adding to said mixture after the removal of said water at least about 50 parts of a second organic solvent boiling below about 100° C., refluxing the mixture of solvents, removing the said second solvent and said brown coffee from the mixture, and then combining the first solvent containing the aromatic constituents extracted from the coffee during said heating steps with the second portion of the first solvent containing the recovered volatiles.

2. The method of claim 1 wherein the solvent is glycerin.

3. The process of claim 1 wherein about 50 to about 200 parts of said second solvent is added to said mixture and said refluxing is carried out for a period of about ½ to 3 hours.

4. A method for preparing an extract containing the flavor and aroma of coffee which comprises mixing about 100 parts of green coffee with at least about 50 to about 200 parts of a first solvent which serves to dissolve and absorb the aromatic constituents of the coffee and which is a water miscible liquid having a boiling point above 200° C., heating the mixture to a temperature of from about 190° C. to about 250° C. but below the boiling point of the solvent until the green coffee has turned brown, cooling the mixture, adding about 2 to about 10 parts of water to the cooled mixture, heating the mixture to distill the water from the mixture, recovering the volatiles which are distilled from said mixture during both of said heating steps, adding to said mixture after the removal of said water about 50 to about 200 parts of a second organic solvent boiling below about 100° C., refluxing the mixture of solvents, removing the said second solvent and said brown coffee from the first solvent containing the aromatic constituents extracted from the coffee during said heating steps and then combining this first solvent mixture with the volatiles recovered during said heating steps.

5. The method of claim 4 wherein said high boiling solvent is glycerin.

6. A product comprising a solution in an edible solvent, of all of the aromatic constituents obtained during the roasting of green coffee until it is brown, in the presence of at least about 50 parts per 100 parts of the coffee of a water miscible solvent for the volatile constituents of the coffee having a boiling point above 200° C., the amount of said solvent being sufficient to effect a thorough wetting, penetration and extraction of the coffee and said roasting being carried out at a temperature of from about 190° C. to 250° C. but below the boiling point of said solvent.

7. The product of claim 6 together with volatile constituents obtained by subsequent steam distillation of the coffee which has been thus roasted with about 2 to about 10 parts of water.

8. A product comprising a solution in an edible solvent, of all of the condensed products of distillation and evaporation given off by green coffee during the roasting thereof until the coffee is brown in the presence of at least 50 parts per 100 parts of coffee of a water miscible first solvent for the volatile constituents of the coffee having a boiling point above 200° C., the amount of said solvent being sufficient to effect a thorough wetting, penetration and extraction of the coffee and said roasting being carried out at a temperature of from about 190° C. to 250° C. but below the boiling point of said solvent, together with volatile constituents obtained by subsequent steam distillation of the roasted coffee with about 2 to about 10 parts of water, and without those constituents of the mixture of steam distilled roasted coffee and said first solvent which have been extracted therefrom by refluxing with at least about 50 parts of a second organic solvent having a boiling point below about 100° C. followed by removal of said second solvent.

9. Instant coffee containing from about 0.05 to about 1% of the product defined in claim 8.

References Cited in the file of this patent

UNITED STATES PATENTS

| | | |
|---|---|---|
| 245,996 | Clotworthy | Aug. 23, 1881 |
| 1,179,046 | Sherer | Apr. 11, 1916 |
| 1,292,458 | Hamor et al. | Jan. 28, 1919 |
| 1,525,272 | Darrah | Feb. 3, 1925 |
| 2,054,689 | Andresen | Sept. 15, 1936 |
| 2,594,385 | Blench | Apr. 29, 1952 |

FOREIGN PATENTS

| | | |
|---|---|---|
| 246,454 | Great Britain | Oct. 14, 1926 |